United States Patent
Nakata et al.

(10) Patent No.: US 7,589,764 B2
(45) Date of Patent: Sep. 15, 2009

(54) FOCUS DETECTION DEVICE INCLUDING REDUCTION OF FLUCTUATIONS DUE TO FLICKERING LIGHT

(75) Inventors: Masahiro Nakata, Saitama (JP); Shigeru Iwamoto, Saitama (JP)

(73) Assignee: Hoya Corporation, Tokyo (JP)

(*) Notice: Subject to any disclaimer, the term of this patent is extended or adjusted under 35 U.S.C. 154(b) by 772 days.

(21) Appl. No.: 11/224,026

(22) Filed: Sep. 13, 2005

(65) Prior Publication Data

US 2006/0055813 A1 Mar. 16, 2006

(30) Foreign Application Priority Data

Sep. 14, 2004 (JP) ............... 2004-267077

(51) Int. Cl.
H04N 9/73 (2006.01)
(52) U.S. Cl. .................................. 348/227.1
(58) Field of Classification Search ............. 348/226.1, 348/227.1, 228.1; 396/180
See application file for complete search history.

(56) References Cited

U.S. PATENT DOCUMENTS

| | | | |
|---|---|---|---|
| 6,871,018 B2 | 3/2005 | Nakata et al. | |
| 6,922,526 B2 | 7/2005 | Nakata et al. | |
| 6,937,818 B2 | 8/2005 | Nakata | |
| 2002/0064383 A1* | 5/2002 | Kawasaki et al. | 396/157 |
| 2003/0012568 A1* | 1/2003 | Ishikawa et al. | 396/104 |
| 2003/0090587 A1* | 5/2003 | Hofer et al. | 348/349 |
| 2003/0112343 A1* | 6/2003 | Katoh et al. | 348/226.1 |

FOREIGN PATENT DOCUMENTS

| | | |
|---|---|---|
| JP | 5-145826 | 6/1993 |
| JP | 9-311270 | 12/1997 |
| JP | 2000-28912 | 1/2000 |
| JP | 2000-121918 | 4/2000 |

OTHER PUBLICATIONS

English language Abstract of JP 5-145826.
English language Abstract of JP 9-311270.
English language Abstract of JP 2000-28912.
English language Abstract of JP 2000-121918.

* cited by examiner

*Primary Examiner*—Sinh Tran
*Assistant Examiner*—Albert H Cutler
(74) *Attorney, Agent, or Firm*—Greenblum & Bernstein PLC

(57) ABSTRACT

A focus detection device includes an AF sensor which converts received object light into electrical charges, integrates the electrical charges, and outputs the integrated electrical charges as a video signal in pixel units; a photometering sensor which converts received light into an electrical signal to output the electrical signal as a photometering signal; a flicker repetition period determining device for determining a flicker repetition period of the received object light from fluctuations of the photometering signal of the photometering sensor; and a controller which causes the AF sensor to start integrating the electrical charges in synchronization with the flicker repetition period.

14 Claims, 11 Drawing Sheets

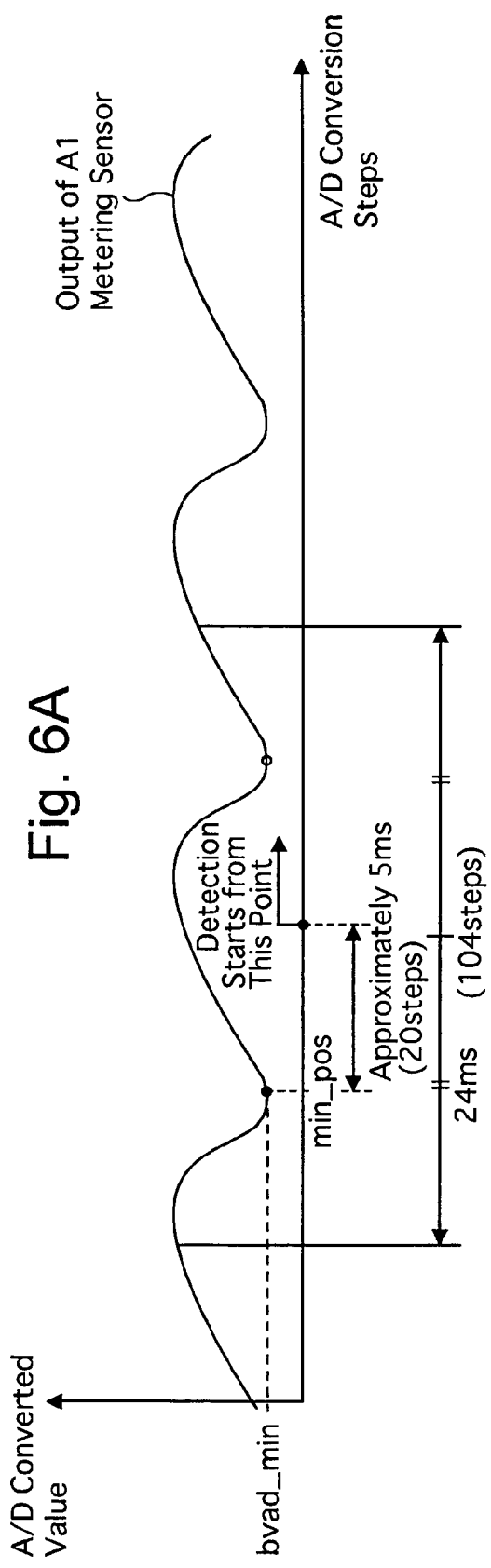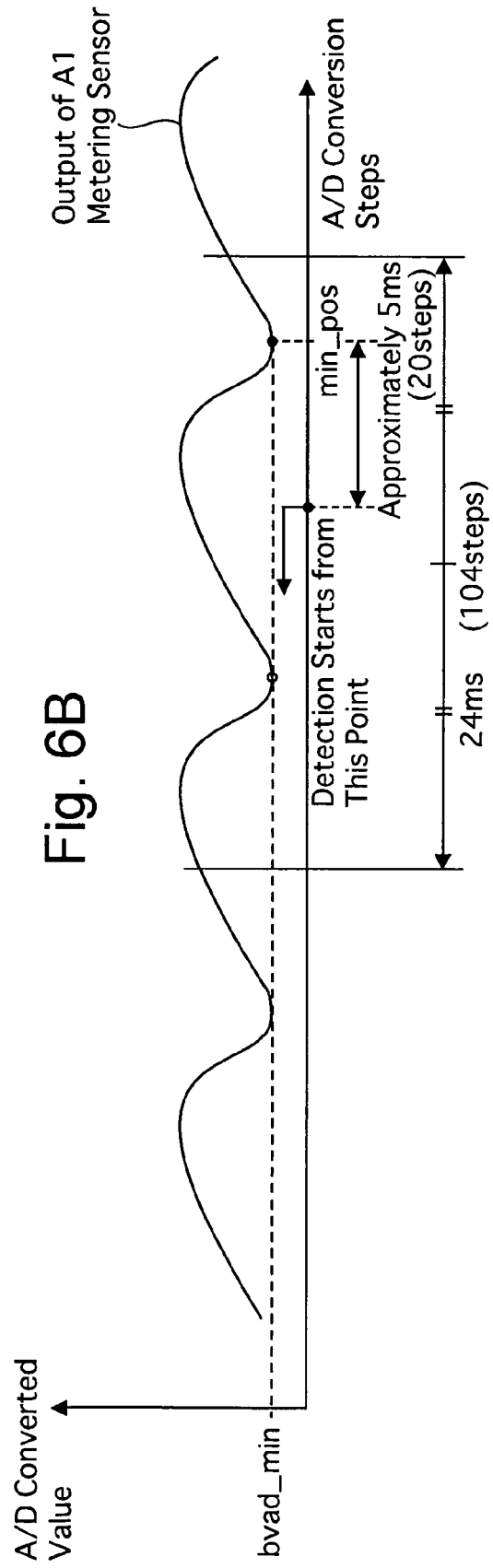

FOCUS DETECTION DEVICE INCLUDING REDUCTION OF FLUCTUATIONS DUE TO FLICKERING LIGHT

BACKGROUND OF THE INVENTION

1. Field of the Invention

The present invention relates to a focus detection device suitable for a camera.

2. Description of the Related Art

Conventional AF single-lens reflex (SLR) cameras are provided with a focus detection device including a phase-difference AF sensor (CCD focus detection device). The AF sensor includes CCD line sensors and monitor sensors. The CCD line sensors receive object light, integrate (accumulate) the object light, and output the integrated electrical charges as a video signal in pixel units. Each monitor sensor outputs a monitor signal corresponding to the amount of the electrical charges integrated by the associated CCD line sensor. The monitor signal output from each monitor sensor is amplified by an auto gain control (AGC) circuit, and the integration operation for all the CCD line sensors is terminated immediately after it is detected that the monitor signal of any of the monitor sensors reaches a predetermined threshold value. A conventional AF single-lens reflex camera having such a CCD focus detection device is disclosed in Japanese unexamined patent publication Hei09-311270.

However, according to such a conventional CCD focus detection device, when the focus detection device operates in flickering lighting such as fluorescent lighting, the output of the AF sensor fluctuates due the flickering lighting, thus deteriorating the accuracy of focus detection.

SUMMARY OF THE INVENTION

The present invention has been devised in view of the above-described conventional problem, and provides a focus detection device which reduces fluctuations of the output of the AF sensor which are caused by flickering lighting to improve the accuracy of focus detection.

According to an aspect of the present invention, a focus detection device is provided, including an AF sensor which converts received object light into electrical charges, integrates the electrical charges, and outputs the integrated electrical charges as a video signal in pixel units; a photometering sensor which converts received light into an electrical signal to output the electrical signal as a photometering signal; a flicker repetition period determining device for determining a flicker repetition period of the received object light from fluctuations of the photometering signal of the photometering sensor; and a controller which causes the AF sensor to start integrating the electrical charges in synchronization with the flicker repetition period.

It is desirable for the flicker repetition period determining device to detect bottom values of the photometering signal of the photometering sensor, an output level of which fluctuates periodically, to determine the flicker repetition period from a time interval between the detected bottom values.

It is desirable for the controller to set an integration cycle reference point, at which a predetermined period of time elapses when each the bottom values is detected, and to cause the AF sensor to start integrating the electrical charges upon an elapsed time from the integration cycle reference point reaching an integer multiple of the flicker repetition period determined by the flicker repetition period determining device.

It is desirable for the flicker repetition period determining device to detect peak values of the photometering signal of the photometering sensor, an output level of which fluctuates periodically, to determine the flicker repetition period from an interval between the detected peak values.

It is desirable for the controller to set an integration cycle reference point in time at which a predetermined period of time elapses from the moment at which each the peak values is detected, wherein the controller causes the AF sensor to start integrating the electrical charges upon an elapsed time from the integration cycle reference point reaching an integer multiple of the flicker repetition period determined by the flicker repetition period determining device.

It is desirable for the flicker repetition period determining device to detect points in time at which the photometering signal of the photometering sensor, an output level of which fluctuates periodically, reaches a predetermined threshold value to determine the flicker repetition period from a time interval between the points.

It is desirable for the controller to set an integration cycle reference point in time at which a predetermined period of time elapses from the moment at which each the points is detected, wherein the controller causes the AF sensor to start integrating the electrical charges upon an elapsed time from the integration cycle reference point reaching an integral multiple of the flicker repetition period determined by the flicker repetition period determining device.

It is desirable for the flicker repetition period determining device to determine that a flicker frequency of the received object light is 50 Hz in the case where the time interval between the detected bottom values is greater than a predetermined time interval, and that the flicker frequency of the received object light is 60 Hz in the case where the time interval between the detected bottom values is one of equal to and smaller than the predetermined time interval.

It is desirable for the flicker repetition period determining device to determine that a flicker frequency of the received object light is 50 Hz in the case where the interval between the detected peak values is greater than a predetermined interval, and that the flicker frequency of the received object light is 60 Hz in the case where the interval between the detected peak values is one of equal to and smaller than the predetermined interval.

It is desirable for the flicker repetition period determining device to determine that a flicker frequency of the received object light is 50 Hz in the case where the time interval between the detected points is greater than a predetermined time interval, and that the flicker frequency of the received object light is 60 Hz in the case where the time interval between the detected points is one of equal to and smaller than the predetermined time interval.

It is desirable for the AF sensor to include CCD line sensors.

It is desirable for the photometering sensor to be a multi-zone photometering IC.

The focus detection device can be incorporated in an autofocus camera.

In an embodiment, a focus detection device is provided, including a phase-difference AF sensor; a photometering sensor; a flicker repetition period determining device for determining a flicker repetition period of object light received by the phase-difference AF sensor from fluctuations of an output level of the photometering sensor; and a controller which causes the phase-difference AF sensor to start performing an integration operation thereof in synchronization with the flicker repetition period.

According to the present invention, fluctuations of the output of the AF sensor which are caused by flickering lighting are reduced to thereby improve the accuracy of focus detection because the integration operation of the AF sensor always starts at the same timing relative to the flicker repetition period of the flickering lighting.

The present disclosure relates to subject matter contained in Japanese Patent Application No.2004-267077 (filed on Sep. 14, 2004) which is expressly incorporated herein by reference in its entirety.

BRIEF DESCRIPTION OF THE DRAWINGS

The present invention will be described below in detail with reference to the accompanying drawings in which:

FIGS. 6A and 6B are conceptual diagrams, each of which illustrates an operation searching a bottom value of an A/D converted value of an output of an A1 photometering sensor, which is performed in the photometering process shown in FIG. 5;

DESCRIPTION OF THE PREFERRED EMBODIMENT

Figure 1:
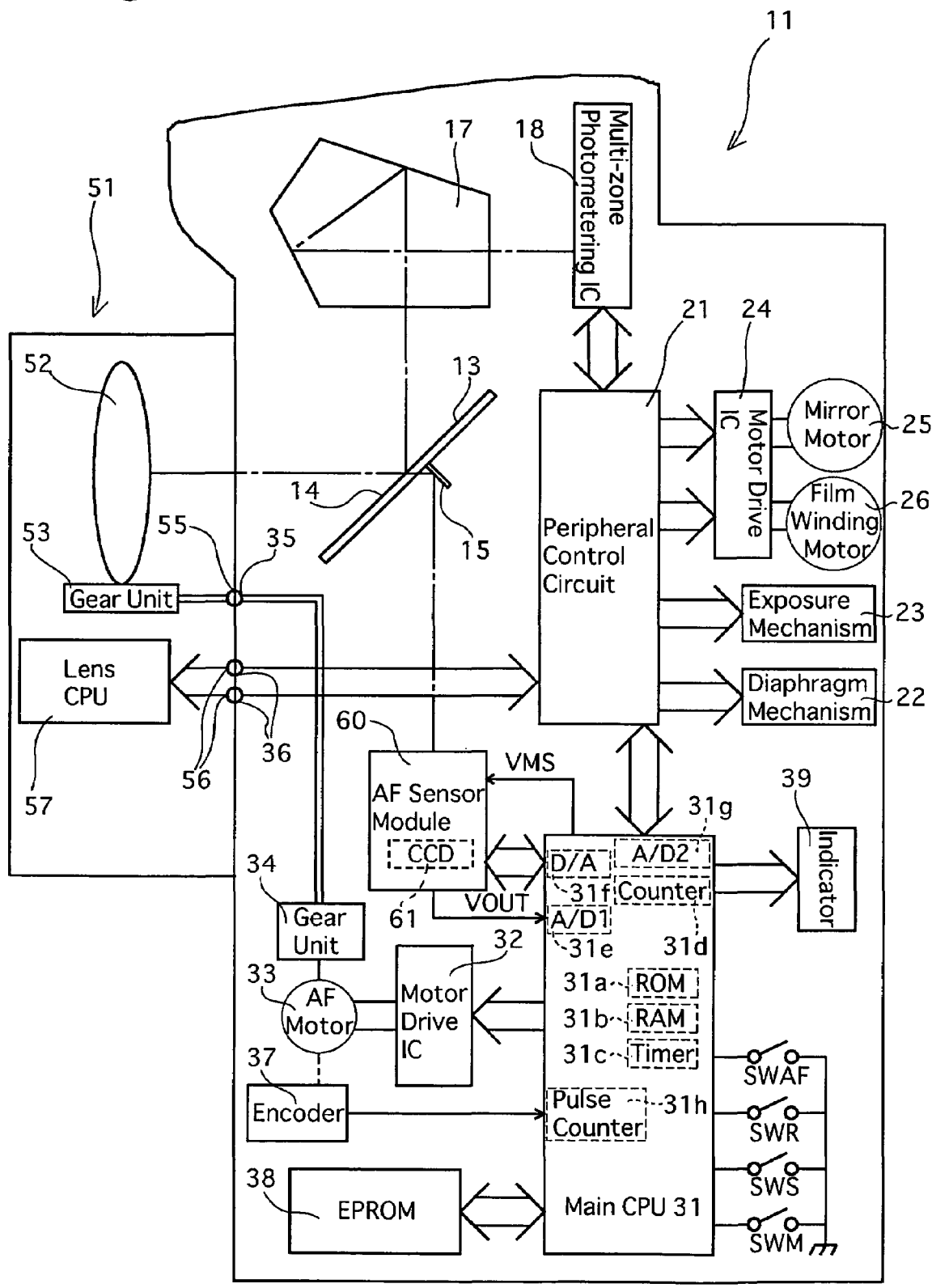
FIG. 1 is a schematic block diagram showing a single-lens reflex camera equipped with a focus detection device according to the present invention.

FIG. 1 is a schematic block diagram showing a single-lens reflex camera equipped with a focus detection device according to the present invention. The AF single-lens reflex camera is provided with a camera body 11 including an AF sensor module (focus detecting module) 60 equipped with a CCD focus detection device 61 as an element for focus detection. The AF single-lens reflex camera is further provided with a photographic lens (AF lens) 51 which is detachably attached to the camera body 11. The camera body 11 includes a main CPU (controller/flicker repetition period determining device) 31 for comprehensively controlling the camera body 11 and the photographic lens 51.

The major portion of an object light bundle, which enters the camera body 11 through the photographic lens 51, is reflected by a main mirror 13 toward a pentagonal prism 17 serving as an element of a finder optical system. The light bundle reflected by the main mirror 13 is reflected by the pentagonal prism 17 to exit from an eyepiece (not shown). A portion of the object light bundle, which is incident on a half mirror portion 14 provided in the center of the main mirror 13, passes through the half mirror portion 14 and thereafter is reflected downward by a sub-mirror 15 provided on the back of the main mirror 13 to enter the AF sensor module 60.

The camera body 11 is provided therein with a multi-zone photometering IC 18 which can divide a photographing area into eight different photometering zones to perform a photometering operation on each of these eight photometering zones. On each of one or more photometering zones which are selected in accordance with a sensor selection signal output from the main CPU 31, the multi-zone photometering IC 18 outputs an electrical signal as object brightness information Bv (photometering signal), which corresponds to the amount of light received by the selected photometering zone or zones, to the main CPU 31. The multi-zone photometering IC 18 includes eight photometering sensors for taking photometering readings independently from the eight different photometering zones. The main CPU 31 performs a predetermined exposure operation based on the object brightness data Bv, film sensitivity information (ISO speed information), and the like, to calculate an appropriate shutter speed and f-number for exposure. Thereafter, a diaphragm mechanism 22 and an exposure mechanism 23 which are provided in the camera body 11 are driven based on the calculated shutter speed and f-number to perform an exposure operation on film. The camera body 11 is provided therein with a peripheral control circuit 21, a motor drive circuit (motor drive IC) 24, a mirror motor 25 and a film winding motor 26. During a photographing operation, the peripheral control circuit 21 drives the mirror motor 25 via the motor drive circuit (motor drive IC) 24 to lift the main mirror 13 upwards. After the completion of the exposure operation, the peripheral control circuit 21 drives the mirror motor 25 to bring the main mirror 13 to its down position (initial position), and then drives the film winding motor 26 to advance the film by one frame.

Figure 2:
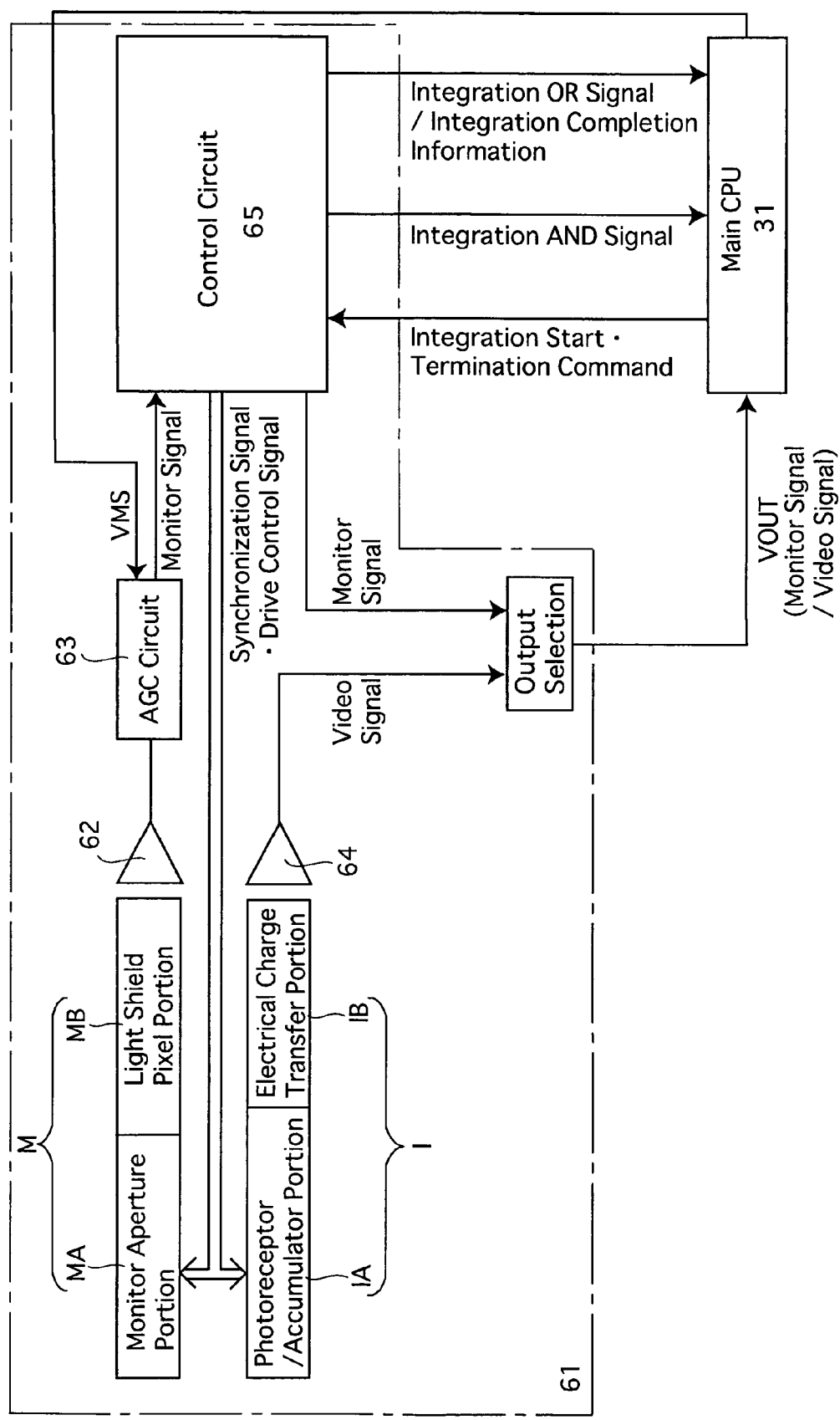
FIG. 2 is a schematic block diagram showing elements of an AF sensor module shown in FIG. 1.

The AF sensor module 60 is a phase-difference detection type using a pupil-division technique. The AF sensor module 60 includes the CCD focus detection device 61 including a plurality of focus detection areas determined so as to correspond to a photographing area. The AF sensor module 60 further includes an AF optical system (not shown) which performs pupil-division on an object light bundle, which forms an object image within the plurality of focus detection areas, to divide the object light bundle into two light bundles on a focus detection plane which is provided at an optically equivalent position to that of an image pickup plane. Subsequently, the AF optical system projects the light bundles onto corresponding line sensors (linear sensor arrays) I (only one of them is shown in FIG. 2) of the CCD focus detection device 61. The CCD focus detection device 61 includes the line sensors I, monitor sensors M (only one of them is shown in FIG. 2) and a control circuit 65. Each of the line sensors I receives and integrates an associated pair of split-pupil object light bundles, each of the monitor sensors M monitors the integrated value sensed by the associated line sensor I, and the control circuit 65 controls operations of each line sensor I and each monitor sensor M. Immediately after a monitor voltage (output voltage) of one monitor sensor M reaches a predetermined threshold value, the control circuit 65 terminates the integration for the line sensor I corresponding to the monitor sensor M. Upon the completion of the integration for all the line sensors I, electrical charges integrated by the line sensors I are successively converted into voltages which are output to the main CPU 31 as a video signal in pixel units.

The main CPU 31 calculates the amount of defocus by a predetermined calculation based on a video signal input from the AF sensor module 60 (the CCD focus detection device 61). Subsequently, based on the calculated amount of defocus, the main CPU 31 determines the direction of rotation and the number of revolutions (the number of pulses output from an encoder 37) of an AF motor 33 for driving a focusing lens group 52 of the photographic lens 51. Accordingly, based on the direction of rotation and the number of pulses determined by the main CPU 31, the main CPU 31 drives the AF motor 33 via an AF motor driver (motor drive IC) 32. Upon driving the AF motor 33, the main CPU 31 operates simultaneously with the rotation of the AF motor 33 to count pulses output from the encoder 37 by a pulse counter 31$h$. Upon the counter value of the pulse counter 31$h$ reaching the above-mentioned number of pulses, the main CPU 31 stops the operation of the AF motor 33.

The photographic lens 51 includes a lens CPU 57, a gear unit 53 for driving the focusing lens group 52 for focus adjustment in an optical axis direction, and a lens joint (e.g. a female AF coupler) 55 which is removably connected to a body joint (e.g., a male AF coupler) 35 of the camera body 11. The lens joint 55 is provided on a mount portion of the photographic lens 51, and the body joint 35 is provided on a mount portion of the camera body 11. Rotation of the AF motor 33 is transferred to the gear unit 53 via the gear unit 34, the body joint 35 and the lens joint 55, so as to move the focusing lens group 52 forward and backward to carry out a focus adjustment via the gear unit 53.

The main CPU 31 includes a ROM 31$a$ for storing control programs and other programs, a RAM 31$b$ for temporarily storing predetermined data for calculation and control, a timer 31$c$ and a counter 31$d$ for time measurement, a first A/D converter 31$e$ for performing A/D conversion on a VOUT signal (image signal/video signal) input from the AF sensor module 60 (the CCD focus detection device 61), a D/A converter 31$f$ for performing D/A conversion on a VMS signal in an integration termination level and outputting a converted VMS signal, a second A/D converter 31$g$ for performing A/D conversion on the object brightness information Bv input from the multi-zone photometering IC 18 via the peripheral control circuit 21, and a pulse counter 31$h$ for counting pulses output from the encoder 37. An EEPROM 38 is connected to the main CPU 31 as an external memory. The EEPROM 38 stores various constants specifically for use for components provided in the camera body 11, selection mode data for the monitor sensors M and the line sensors I which are used by the CCD focus detection device 61.

Furthermore, a main switch SWM, an autofocus switch SWAF, a photometering switch SWS and a release switch SWR are also connected to the main CPU 31. The main switch SWM is for turning a power source ON and OFF. The autofocus switch SWAF is for switching between autofocus control and manual focus control. The photometering switch SWS is turned ON while a release button (not shown) is being pressed halfway down or completely down. The release switch SWR is turned ON upon the release button being fully depressed.

When the photometering switch SWS is turned ON, the main CPU 31 activates the multi-zone photometering IC 18 via the peripheral control circuit 21 to measure the brightness of the object so as to perform an exposure calculation. At the same time, the main CPU 31 activates the AF sensor module 60 to input a video signal from the CCD focus detection device 61 to calculate the amount of defocus on the basis of the input video signal. Thereafter, the main CPU 31 calculates an amount of driving of the focusing lens group 52 on the basis of the calculated amount of defocus, and drives the AF motor 33 by the calculated amount of driving of the focusing lens group 52.

The main CPU 31 displays set modes such as AF mode, exposure mode and photographing mode and also a selected shutter speed and a selected f-number mode on a display device 39 of the camera body 11. The display device 39 generally includes display panels provided at two positions, i.e., on an outer surface of the camera body 11 and within a field of view of a viewfinder of the camera body 11.

The lens CPU 57 is connected to the peripheral control circuit 21 of the camera body 11 via a plurality of electrical contacts 36 and a corresponding plurality of electrical contacts 56 which are provided on the aforementioned mount portion of the photographic lens 51 and the aforementioned mount portion of the camera body 11, respectively. The lens CPU 57 performs predetermined data communication with the main CPU 31 via the peripheral control circuit 21 for data such as aperture f-number and the maximum f-number information, focal distance information, and lens position (distance) information.

The AF sensor module 60, which is incorporated in the camera body 11, will be hereinafter discussed in detail with reference to FIG. 2. FIG. 2 is a schematic block diagram showing elements of the AF sensor module 60. The CCD focus detection device 61, that is incorporated in the AF sensor module 60, is provided on a light receiving surface thereof with the plurality of line sensors I which are arranged with a predetermined regularity in association with the aforementioned predetermined plurality of focus detection areas. The plurality of monitor sensors M are each respectively positioned adjacent to the plurality of line sensors I. The structure and basic operations of each line sensor I are the same. Likewise, the structure and basic operations of each monitor sensor M are the same. In FIG. 2, only one of the plurality of line sensors I and the associated one monitor sensor M are shown. The control circuit 65, the line sensors I and the monitor sensors M are installed on a common circuit board.

Each line sensor I is a CCD line sensor in which a large number of light receiving elements are arranged in a row, and includes a photoreceptor/accumulator portion IA and an electrical charge transfer portion IB. The photoreceptor/accumulator portion IA integrates (accumulates) electrical charges, which are photoelectrically converted by the number of light receiving elements, on each light receiving element. The electrical charge transfer portion IB is made of a light shield pixel array, and transfers the electrical charges integrated by the photoreceptor/accumulator portion IA. Each monitor sensor M includes a light receiving surface (monitor aperture portion MA), the area of which is several times greater than the area of a single pixel element of the photoreceptor/accumulator portion IA, to monitor the amount of light received by the associated line sensor I. Each monitor sensor M further includes a light shield pixel portion MB.

The control circuit 65 carries out data communication with the main CPU 31 to control operations of the CCD focus detection device 61 in accordance with various setting information and control signals which are input from the main CPU 31, and outputs various information such as an integration OR (logical add) signal and an integration AND (logical multiplication) signal to the main CPU 31. Upon inputting an integration-start command from the main CPU 31, the control circuit 65 performs a sweep-drive operation on the line sensors I to clear the charges accumulated in each pixel (photodiode) immediately before the commencement of integration in order to commence integration (charge accumulation) in pixel units. Simultaneously, the integrated charges of the monitor sensors M are cleared so that the monitor sensors M start monitoring the amount of integration. The integrated charges of the monitor sensors M are transferred from the monitor aperture portion MA to a monitor charge detecting section 62 via the light shield pixel portion MB, and are converted into a voltage by the monitor charge detecting section 62 to be output to an auto gain controller (AGC circuit) 63. The monitor charge detecting section 62 and the auto gain controller 63 are provided on each monitor sensor M, though only one monitor charge detecting section 62 and only one auto gain controller 63 are shown in FIG. 2. Each auto gain controller 63 operates in accordance with a VMS signal output from the main CPU 31 to output a monitor signal of the associated monitor sensor M to the control circuit 65.

The control circuit 65 is provided for each monitor sensor M with a logic element (for example, an operational amplifier) serving as a detection device for detecting that the monitor signal (output voltage) of the monitor sensor M reaches a predetermined threshold value (AGC level). When an output of any of the logic elements change, the control circuit 65 outputs an integration OR signal to the main CPU 31. The integration OR signal is at a high level when the monitor signals of all the monitor sensors M are below a predetermined threshold value, and drops to a low level when the monitor signal of any of the monitor sensors M reaches the predetermined threshold value. Following the integration OR signal, the control circuit 65 outputs integration completion information on the monitor sensors M to the main CPU 31 when the integration OR signal drops to a low level. Furthermore, the control circuit 65 outputs the integration AND signal to the main CPU 31 immediately after the monitor signals of all the monitor sensors M reach the predetermined threshold value, i.e., immediately after the outputs of all the logic elements change. Upon inputting the integration OR signal from the control circuit 65, the main CPU 31 detects the completion of integration for the corresponding monitor sensor M and line sensor I, and measures the amount of integration time of another monitor sensor M and the associated line sensor I which are in the middle of integration from the integration completion information that is input after the integration OR signal. Furthermore, the main CPU 31 detects whether the integration for all the line sensors I has been completed upon inputting the integration AND signal. The main CPU 31 outputs an integration termination command to the control circuit 65 if the integration for all the line sensors I has been completed within a predetermined period of time or if this predetermined period of time elapses before the completion of the integration for all the line sensors I. Upon inputting the integration termination signal from the main CPU 31, the control circuit 65 forcibly terminates the integration for the line sensors I if the line sensors I are in the middle of integration, and concurrently transfers the integrated electrical charges of all the line sensors I (the photoreceptor/accumulator portion IA) to a CCD charge detecting section 64 successively in pixel units via the electrical charge transfer portion IB to be converted into a voltage signal by the CCD charge detecting section 64. This integration termination process causes the photoreceptor/accumulator portion IA to stop integrating electrical charges.

The CCD focus detection device 61 (the AF sensor module 60) alternatively outputs a monitor signal of the monitor sensors M to the main CPU 31 as a VOUT signal during integration for the line sensors I. After the completion of the integration for the line sensors I (after either the integration for all the line sensors I is completed or the integration for the line sensors I is forcibly terminated after a lapse of a predetermined period of time), the video signal of the line sensors I is output to the main CPU 31 as a VOUT signal. The main CPU 31 converts the input video signal into a digital signal in pixel units by the first A/D converter 31*e*, which is integrated in the main CPU 31, to store the digital signal in the RAM 31*b* in sequence if the input VOUT signal is a video signal of the line sensors I. If the input VOUT signal is a monitor signal of the monitor sensors M, the main CPU 31 converts the input monitor signal into a digital signal by the first A/D converter 31*e* to utilize the digital signal for predicting integral action time and gain setting (AGC level setting).

Figure 10A:
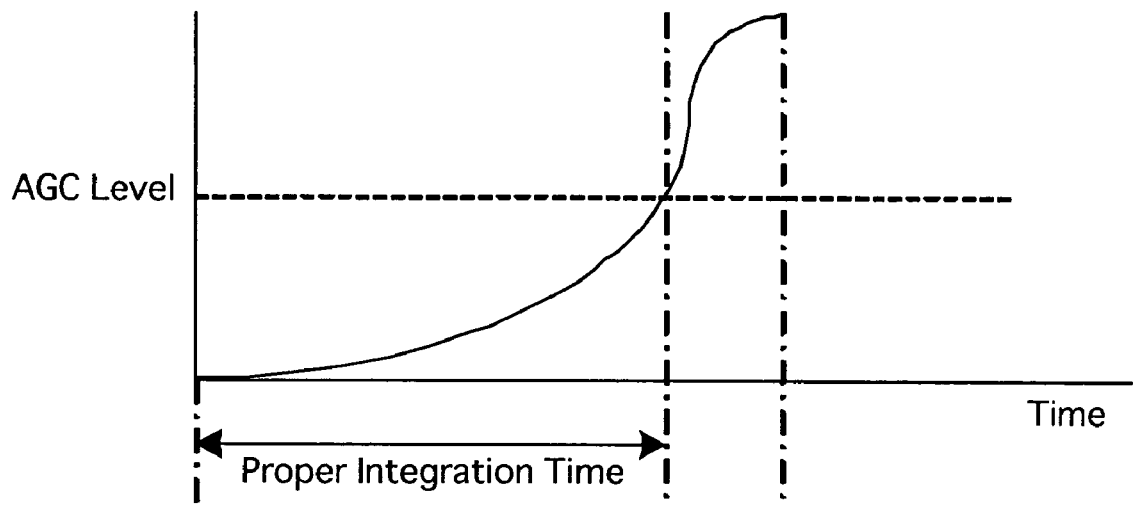
FIG. 10A is a conceptual diagram showing an integral waveform in a monitor aperture portion (photoreceptor/accumulator portion) in the case where the transfer distance from the monitor aperture portion to a charge detecting section is long.
Figure 10B:
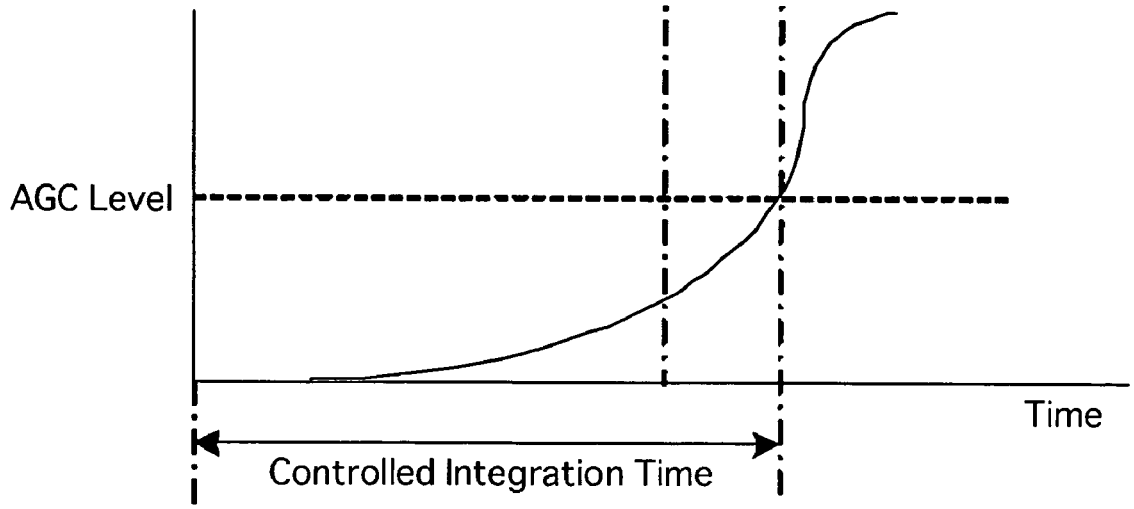
FIG. 10B is a conceptual diagram showing an integral waveform in the charge detecting section in the case where the transfer distance from the monitor aperture portion to the charge detecting section is long.

In the AF sensor module 60 having the above described structure, the distance from the monitor aperture portion (light receiving surface) MA to the monitor charge detecting section 62 is extended because of the large number of the line sensors I and the monitor sensors M and because it is difficult to secure wiring space in close vicinity of the line sensors I and the monitor sensors M due to, e.g., miniaturization of the AF sensor module 60. In this particular structure of the AF sensor module 60, no problem arises if the charge transfer distance is short. However, if the charge transfer distance is excessively long, the integrated charges are transferred with a delay, which may cause a difference between the integrated value in the monitor aperture portion MA and the integrated value in the monitor charge detecting section 62. For instance, as shown in FIGS. 10A and 10B, in the case where it is detected that the monitor signal of one monitor sensor M is below the predetermined threshold value (AGC level) in the monitor charge detecting section 62 even though the monitor signal has reached the predetermined threshold value (AGC level) in the monitor aperture portion MA, the integration operation of the CCD line sensor I continues to be performed beyond a normal integral action time to thereby increase the output of the CCD line sensor I excessively to a greater level than necessary. If constant, the magnitude of the difference between the integrated value in the monitor aperture portion MA and the integrated value in the monitor charge detecting section 62 is considered to be capable of being corrected, e.g., by correcting the integrated value in the monitor aperture portion MA on the basis of the integrated value in the monitor charge detecting section 62. However, in the case where the AF sensor module 60 operates in flickering lighting, such flickering cannot be fully accommodated, and the difference between the integrated value in the monitor aperture portion MA and the integrated value in the monitor charge detecting section 62 fluctuates due to the flickering lighting. The level of fluctuations of this difference is unpredictable. Accordingly, under flickering lighting, the output of the CCD focus detection device 61 becomes unstable at every integration process, and accordingly, a high-precision focusing operation could not be expected in the prior art.

The above illustrated embodiment of the AF sensor module 60 is characterized by the timing of commencement of integration of the CCD focus detection device 61 (the line sensors I) to reduce fluctuations of the output of the CCD focus detection device 61 which are caused by flickering of flickering lighting. The integration operation of the CCD focus detection device 61 is controlled by the main CPU 31 via the control circuit 65 of the CCD focus detection device 61. In the presence of flickering lighting, the main CPU 31 determines the flicker repetition period (flicker frequency) from fluctuations of the output of the multi-zone photometering IC 18, and brings the CCD focus detection device 61 to always start integrating at the same timing in synchronization with the flicker repetition period.

Figure 3:
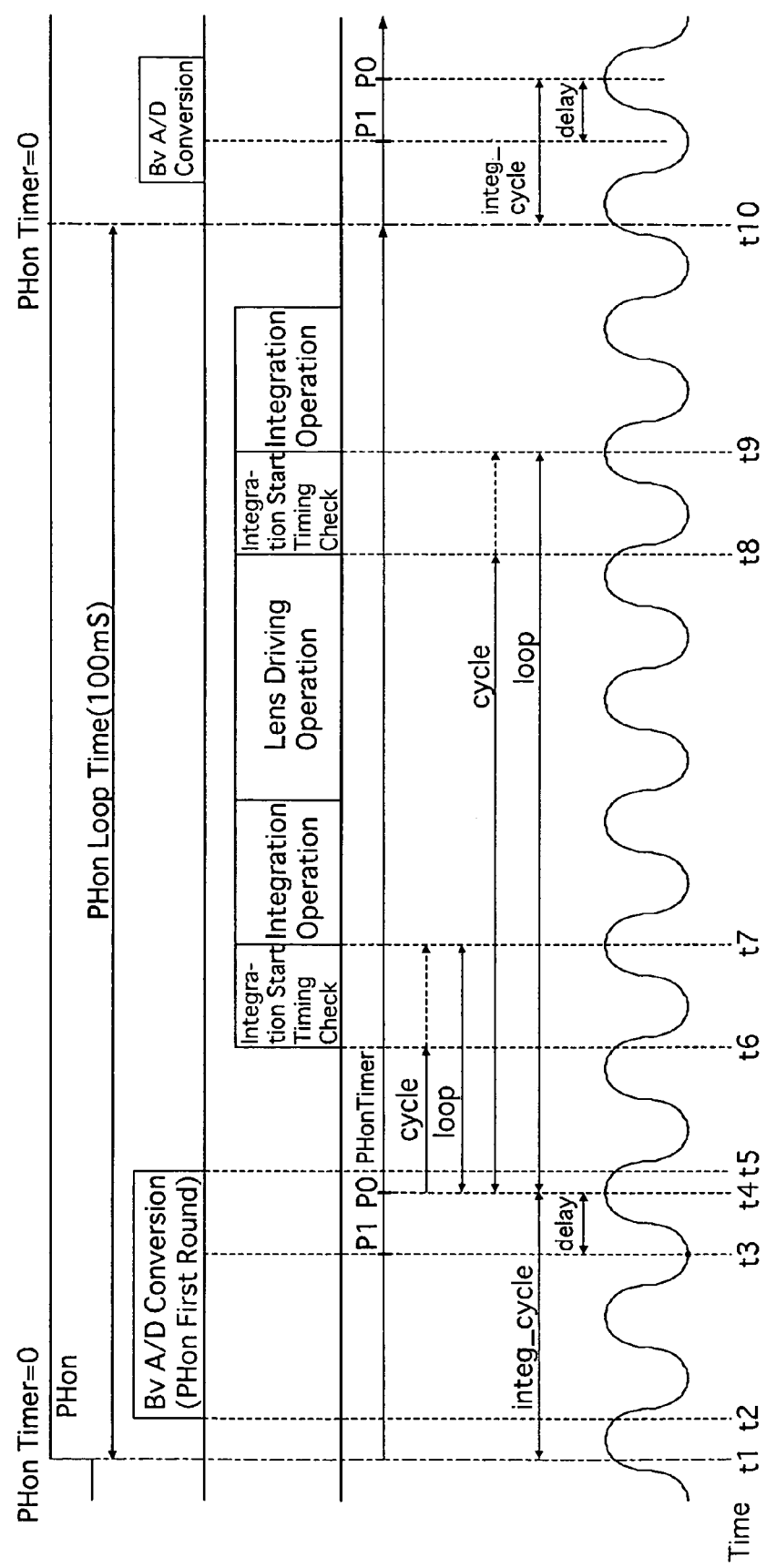
FIG. 3 is a timing chart showing integration control operations of a CCD focus detection device shown in FIGS. 1 and 2.

Integration control operations of the CCD focus detection device 61 which are performed by the main CPU 31 will be hereinafter described in detail with reference to a timing chart shown in FIG. 3.

(TIME t1)

A PHon loop-time timer (100-ms timer) is started by the main CPU 31 to start incrementing a PHon loop-time timer value Px. This PHon loop-time timer is for setting a period of execution of processes such as photometering process, AE calculation process and indicating process, increments the PHon loop-time timer value Px with the passage of time, and is restarted every time a time period of 100 milliseconds elapses.

(TIME t2)

After a lapse of a predetermined period of time from the commencement of the PHon loop-time timer on the first round of operation thereof, the main CPU 31 starts a photometering process. In the photometering process, the second A/D converter 31g performs A/D conversion on the object brightness information Bv that is output from the multi-zone photometering IC 18 to be input to the main CPU 31, the A/D converted value is stored in the RAM 31b of the main CPU 31 in association with an A/D conversion step number (numerical value indicating the number of times the A/D conversion has been performed), and a bottom value (the minimum A/D converted value) of the output of the multi-zone photometering IC 18 is detected. The total processing time for the photometering process performed in the first round of operation of the PHon loop-time timer is greater than a normal photometering process (i.e., a photometering process performed in the second round of operation of the PHon loop-time timer or a later round of operation of the PHon loop-time timer), and is set to, e.g., twice the total processing time for the photometering process performed in the normal photometering process.

(TIME t3)

When a bottom value of the output of the multi-zone photometering IC 18 is detected, the main CPU 31 calculates the time interval from the minimum A/D converted value (this bottom value) to another minimum A/D converted value (a bottom value) of the subsequent adjacent period (time interval between adjacent two bottom values), determines the flicker repetition period (flicker frequency) based on this calculated interval, and sets a time "delay" and a reference point (integration cycle reference point) "integ_cycle" P0. The time "delay" represents a standby time from a bottom value (a minimum A/D converted value) to the timing of commencement of integration. In this particular embodiment, the time "delay" is set to 5 milliseconds or 4.16 milliseconds when the flicker frequency is 50 Hz or 60 Hz, respectively, to make the CCD focus detection device 61 start integrating electrical charges in synchronization with the peaks of flickering light. The reference point (integration cycle reference point) "integ_ cycle" P0 is a point at which the time "delay" elapses from the moment a bottom value of the output of the multi-zone photometering IC 18 is detected, and corresponds to TIME t4: the sum of a PHon loop-time timer value P1 (=t3) (at which the aforementioned bottom value of the output of the multi-zone photometering IC 18 is detected) and the time "delay". The reference point "integ_cycle" P0 is updated every time a bottom value of the output of the multi-zone photometering IC 18 is detected in the photometering process.

(TIME t5)

After the completion of the first photometering process, the AE calculation process, the indicating process, a release switch check process and an AF process are performed in sequence.

(TIME t6)

An integration-start timing check process commences in the integration process performed in the AF process. In the integration-start timing check process, a cycle-timer starts counting and the main CPU 31 remains in a standby state, i.e., is waiting for the integration to start, until the cycle-timer exceeds a loop-time value. The cycle-timer is a timer for clocking the elapsed time from the reference point "integ_ cycle" P0, and the time of this timer at the commencement of timing thereof corresponds to TIME t4 subtracted from TIME t6 (i.e., TIME T6–TIME T4). The loop-time value indicates the time required from the reference point "integ_cycle" P0 to the subsequent integration-start timing. The loop-time value is calculated according to the following arithmetic expression: ABS (the cycle-timer value/a reference period T+1)×the reference period T. The reference period T is 10 milliseconds or 8.33 milliseconds when the flicker frequency is 50 Hz or 60 Hz, respectively. Since the arithmetic expression ABS (the cycle-timer value/the reference period T+1) is the greatest integer which is smaller than a value assigned to the argument (cycle-timer value/reference period T+1), the loop-time value becomes an integer multiple of the reference period T. The relationship between the cycle-timer value and the loop-time value at the commencement of the integration-start timing check process, a release switch check process when the flicker frequency is, e.g., 50 Hz is shown in Table 1.

TABLE 1

| CYCLE-TIMER VALUE | LOOP-TIME VALUE |
|---|---|
| 0-9 ms | 10 ms |
| 10-19 ms | 20 ms |
| 20-29 ms | 30 ms |
| 30-39 ms | 40 ms |

The timing of integration commencement of the CCD focus detection device 61 is set to the same timing every time due to the main CPU 31 standing by until the cycle-timer exceeds the time of the loop-time value. In the present embodiment, operations of the AF sensor module 60 are controlled so that the integration operation of the CCD focus detection device 61 starts from the moment at which the flickering of flickering light becomes maximum.

(TIME t7)

The integration operation of the CCD focus detection device 61 (the line sensors I) is started upon the cycle-timer exceeding the time of the timer "loop", and the main CPU 31 inputs a video signal from the CCD focus detection device 61 upon the completion of the integration for all the line sensors I. Subsequently, the amount of defocus is calculated on the basis of the input video signal, and the AF motor 33 is driven by an amount of driving of the focusing lens group 52 which corresponds to the calculated amount of defocus.

(TIME t8)

After the driving of the focusing lens group 52, the AF process is repeated until the expiration of the PHon loop-time timer. In the integration-start timing check process in the AF process, the main CPU 31 also remains in a standby state until the cycle-timer value exceeds the loop-time value.

(TIME t9)

The integration operation of the CCD focus detection device 61 is started upon the cycle-timer exceeding the time of the timer "loop", and the main CPU 31 inputs a video signal from the CCD focus detection device 61 upon the completion of the integration for all the line sensors I to calculate the amount of defocus on the basis of the input video signal.

(TIME t10)

Upon the expiration of the PHon loop-time timer (upon the PHon loop-time timer counting to 100 milliseconds in this particular embodiment), the PHon loop-time timer is reset in order to restart. After the restarting of the PHon loop-time timer, the photometering process, the integration-start timing check process are repeated in the same manner as the above described manner.

Integration control operations of the CCD focus detection device 61, which are performed by the main CPU 31, will be described in greater detail with reference to timing charts shown in FIGS. 6A and 6B, and flow charts shown in FIGS. 4, 5A, 5B, 7, 8 and 9. The flow charts shown in FIGS. 4, 5A, 5B, 7, 8 and 9 represent a series of processes performed according to control programs written in the ROM 31a.

Figure 4:
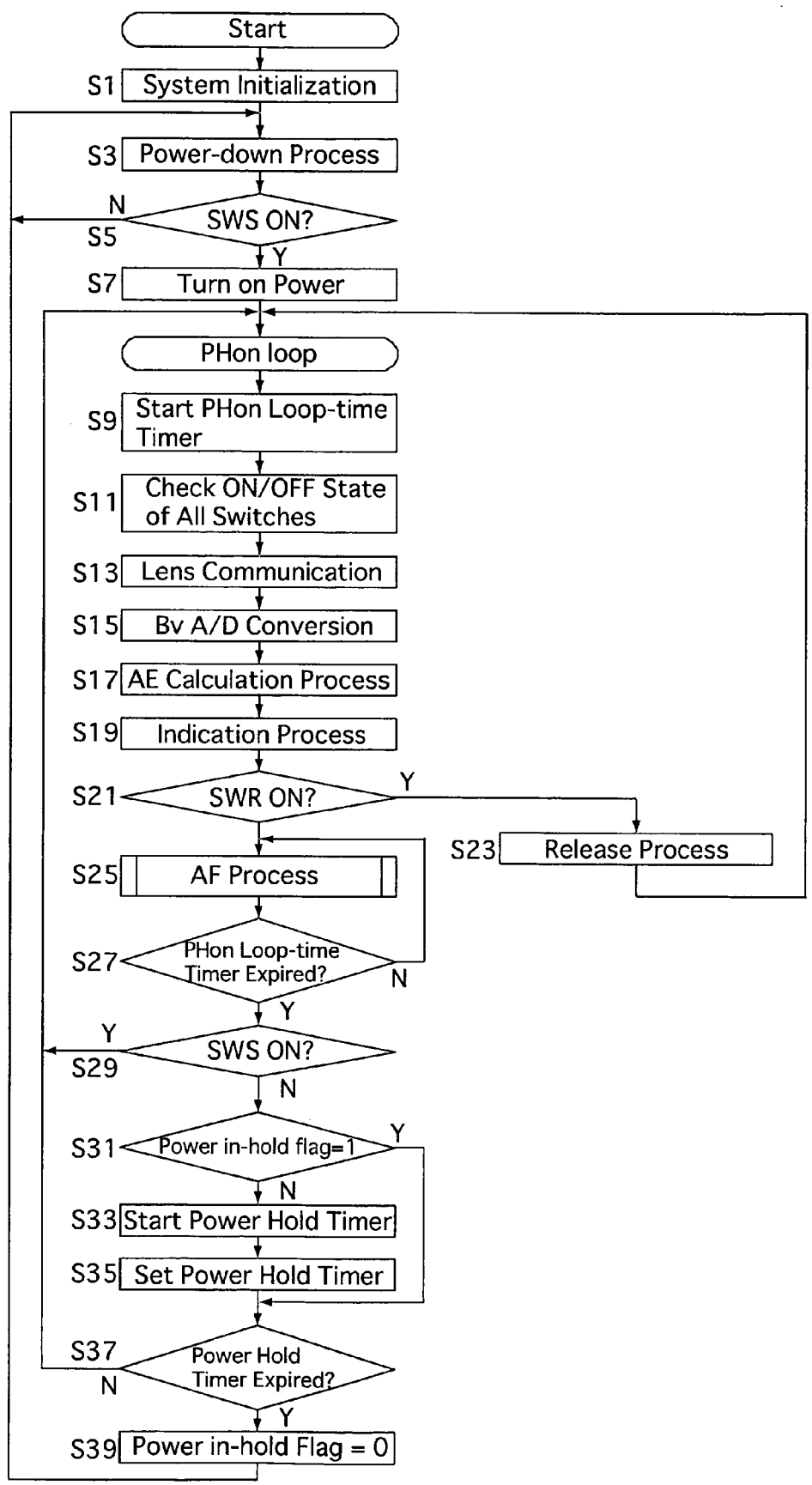
FIG. 4 is a flow chart showing a camera's overall process of the single-lens reflex camera shown in FIG. 1.

FIG. 4 shows the camera's overall process of the single-lens reflex camera shown in FIG. 1 which is started upon a battery being loaded into the camera body 11. Upon a battery being loaded into the camera body 11, the main CPU 31 initializes each I/O port thereof, initializes the RAM 31b, various constants and correction values which are used in processing (step S1). Subsequently, the main CPU 31 cuts off power supplied to peripheral circuits to put the camera into a power-off state, and performs a power-down process in which all the display panels of the display device 39 of the camera body 11 are turned OFF (step S3). Thereafter, it is checked whether or not a photometering switch SWS is ON (step S5). If the photometering switch SWS is OFF (if NO at step S5), control returns to step S3 to maintain the power-off state. If the photometering switch SWS is ON (if YES at step S5), a power-on process in which the main CPU 31 starts supplying power to peripheral circuits to put the camera into a power-on state is performed (step S7), and a PHon loop process is repeated.

[PHon Loop Process]

In the PHon loop process, firstly the PHon loop-time timer, which restarts every time a time period of 100 milliseconds elapses, is started (step S9), ON/OFF states of all switches are input (step S11), and predetermined data communication (lens data communication) are performed between the lens CPU 57 and the main CPU 31 to input lens information on the photographing lens 51 (step S13). Subsequently, the object brightness information Bv that is output as an analog signal from the multi-zone photometering IC 18 is converted into a digital signal by the second A/D converter 31g (S15), and the AE (auto-exposure) calculation process is performed based on the input lens information and the A/D converted object brightness information Bv (step S17). In the AE calculation process, an appropriate exposure value Ev, an appropriate shutter speed Tv and an appropriate aperture value Av are calculated, and also an EE pulse number corresponding to the appropriate shutter speed Tv is calculated. After the AE calculation process, information necessary for a photographing operation such as photometric calculated values (Tv, Av), the number of available frames and battery status are indicated on the display device 39 (step S19), and it is checked whether or not the release switch SWR is ON (step S21). If the release switch SWR is ON (if YES at step S21), a release process in which a mirror-up process, an exposure process and a mechanical charge process are performed in sequence is performed (step S23), and control returns to step S9. If the release switch SWR is OFF (if NO at step S21), the AF process is performed (step S25), and it is checked whether the PHon loop-time timer has expired (step S27). If the PHon loop-time timer has not yet expired (if NO at step S27), control returns to step S25 to repeat the AF process until the expiration of the PHon loop-time timer.

If the PHon loop-time timer has expired (if YES at step S27), it is checked whether or not the photometering switch SWS is ON (step S29). If the photometering switch SWS is ON (if YES at step S29), control returns to step S9. If the photometering switch SWS is not ON (if NO at step S29), it is checked whether or not a power in-hold flag is 1 (step S31). Subsequently, if the power in-hold flag is not 1 (if NO at S31), a power hold timer is started (step S33), the power in-hold flag is set to 1 (step S35), and control proceeds to step S37. If the power in-hold flag is 1 (if YES at S31), control skips the operations at steps S33 and S35 to proceed to step S37. It is checked at step S37 whether or not the power hold timer has expired. If the power hold timer has not yet expired (if NO at step S37), control returns to step S9 to repeat the operations at steps S9 through S37. If the power hold timer has expired (if YES at step S37), the power in-hold flag is reset to zero (step S39), and control proceeds to step S3.

Figure 5A:
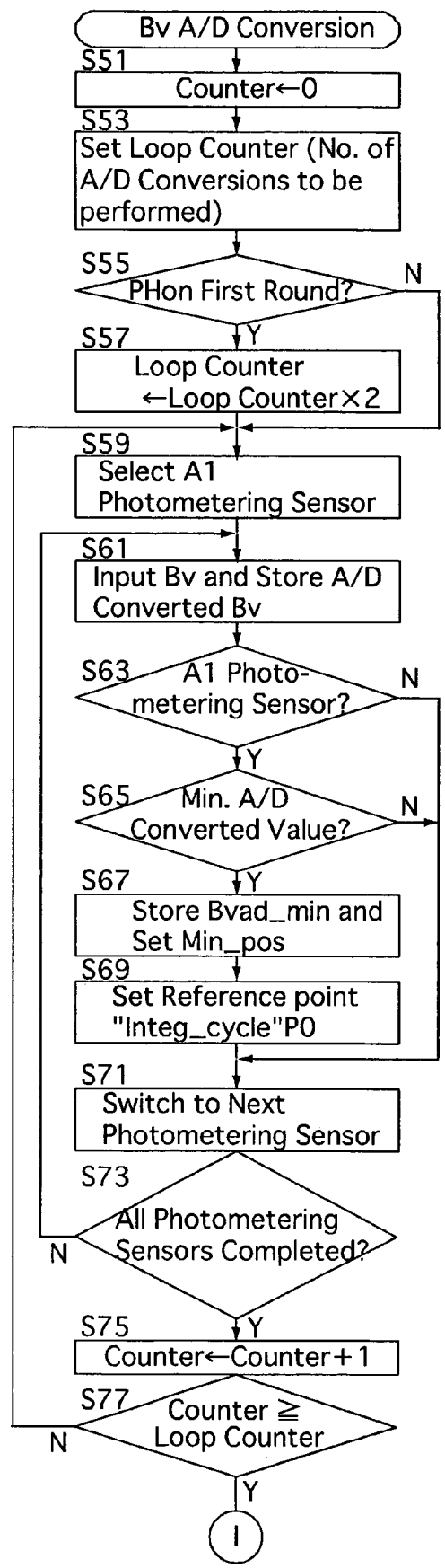
FIGS. 5A and 5B show a flow chart showing a photometering process (BV A/D conversion) performed in the camera's overall process shown in FIG. 4.
Figure 5B:
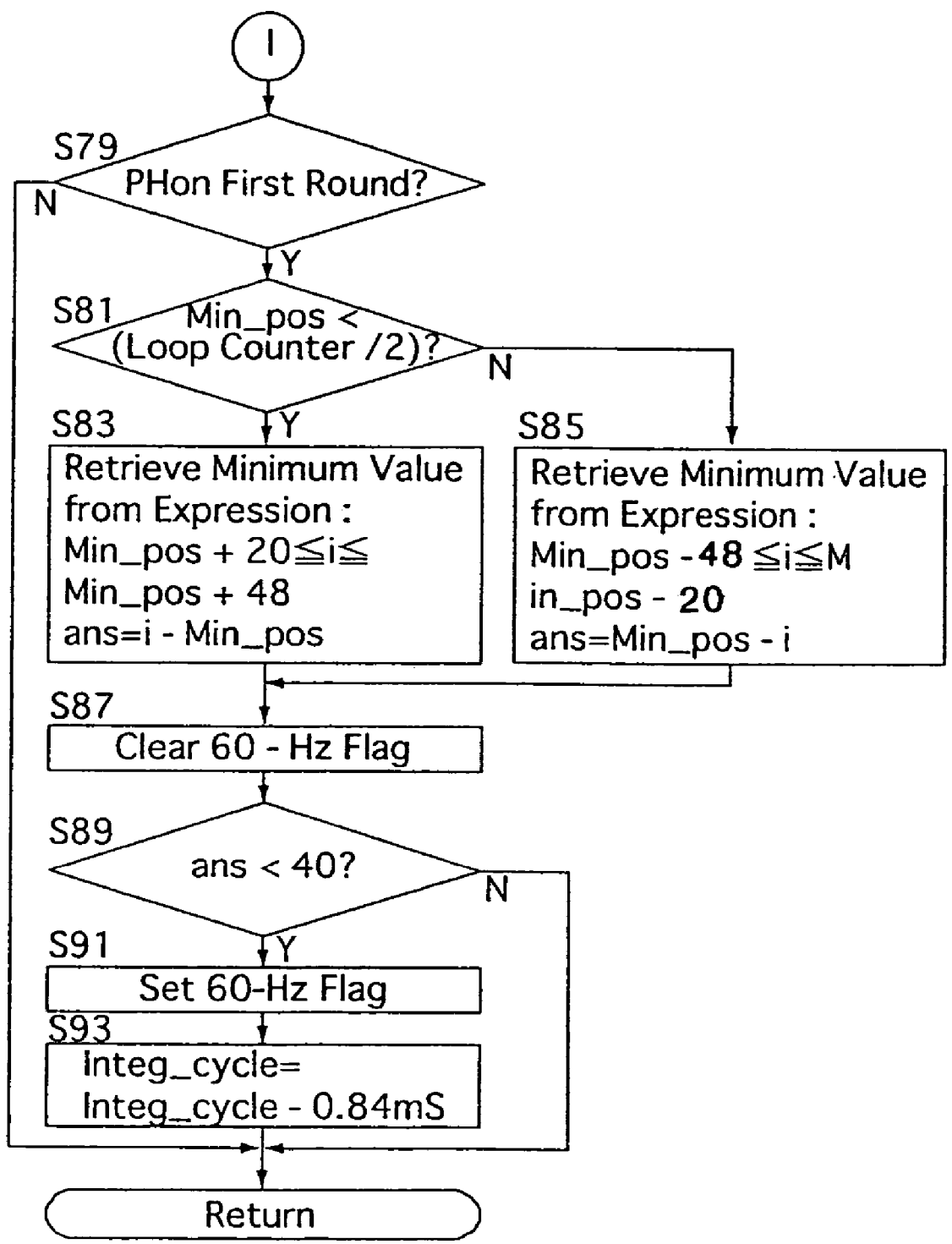

FIGS. 5A and 5B show a flow chart showing the photometering process (BV A/D conversion process) performed at step S15 in the camera's overall process shown in FIG. 4. At the start of the photometering process, the value of the counter 31d which counts the number of A/D conversion steps is initialized to 0 (zero) (step S51), and a loop counter value which determines the A/D conversion step number (i.e., the number of times the A/D conversion has to be performed) is set to 1 (step S53). The A/D conversion step number is defined so that the period of executing the A/D conversion on all output from the photometering sensors, while the photometering sensors are being switched from one to another, corresponds to one step of the A/D conversion step number. In this particular embodiment, the period of time required for this one step of the A/D conversion step number is approximately 230 microseconds, and the output of each photometering sensor of the multi-zone photometering IC 18 is converted into a digital signal in a sufficiently short repetition period of, e.g., every a few hundred microseconds. At step S53, the A/D conversion step number is set to 52 as the loop counter value which corresponds to 12 milliseconds.

After the operation at step S53, it is checked whether or not the currently-performed PHon loop process is looping for the first time (step S55). If the PHon loop process is looping for the first time (if YES at step S55), the loop counter value is set to double the value of the normal loop counter value, i.e., 104 in this particular embodiment (step S57). The reason why the loop counter value is set to double the value of the normal loop counter value (which is used when the PHon loop process loops a second time and thereafter) is because the output of the photometering sensors, specifically bottom values of the flickering light included in the output of the multi-zone photometering IC 18 can be detected reliably. If it is determined that the currently-performed PHon loop process is not looping for the first time (if NO at step S55), control skips the operation at step S57 to proceed to step S59. At step S59, an A1 photometering sensor for photometering a central area of the photographing area is selected from among a plurality of photometering sensors (eight photometering sensors corresponding to the eight photometering zones in this particular embodiment) of the multi-zone photometering IC 18.

Subsequently, the output (photometering signal) from the currently-selected photometering sensor of the multi-zone photometering IC 18 is input to be converted into a digital signal (A/D converted value) by the second A/D converter 31$g$, and this A/D converted value is stored in the RAM 31$b$ in association with the A/D conversion step number (the counter value of the counter 31$d$) upon the acquisition of the A/D converted value (step S61). Subsequently, it is checked whether or not the currently-selected photometering sensor is the A1 photometering sensor (step S63). If the currently-selected photometering sensor is the A1 photometering sensor (if YES at step S63), it is checked whether or not the A/D converted value obtained at step S61 is the minimum A/D converted value of the A1 photometering sensor (step S65). If the currently-selected photometering sensor is not the A1 photometering sensor (if NO at step S63) or the A/D converted value obtained at step S61 is not the minimum A/D converted value of the A1 photometering sensor (if NO at step S65), control skips the operations at steps S67 and S69 to proceed to step S71.

If the A/D converted value obtained at step S61 is the minimum A/D converted value of the A1 photometering sensor (if YES at step S65), this means that a bottom value of the A1 photometering sensor has been detected, so that this minimum A/D converted value is stored in the RAM 31$b$ as an A/D converted value "bvad_min", and a value "min_pos" is set to the A/D conversion step number (the counter value of the counter 31$d$) upon the acquisition of this minimum A/D converted value (step S67). Furthermore, the aforementioned reference point (integration cycle reference point) "integ_cycle" P0 is set (step S69), and control proceeds to step S71. The reference point "integ_cycle" P0 is determined by the sum of the PHon loop-time timer value P1 (=time t3 shown in FIG. 3) at the time of the A/D converted value reaching the minimum A/D converted value (bottom value) of the A1 photometering sensor, and the time "delay" according to the flicker frequency (P0=P1+delay). Before the determination of the flicker frequency, the time "delay" is set to 5 milliseconds as a default for the flicker frequency of 50 Hz. The reference point "integ_cycle" P0 is updated every time the A/D converted value "bvad_min" of the A1 photometering sensor is detected.

At step S71 the currently-selected photometering sensor is switched to another photometering sensor among the plurality of photometering sensors of the multi-zone photometering IC 18, and subsequently, it is checked whether or not all the photometering sensors of the multi-zone photometering IC 18 have been selected (step S73). In this particular embodiment, after all the photometering sensors have been selected at step S71, the current-selected photometering sensor is finally switched to the A1 photometering sensor once again at step S71 because the A1 photometering sensor is firstly selected at step S59. Therefore, at step S73, if the A1 photometering sensor has been selected, it is determined that 'YES' the switching of all the photometering sensors of the multi-zone photometering IC 18 has occurred, and if a photometering sensor other than the A1 photometering sensor has been selected, it is determined that 'NO', the switching of all the photometering sensors of the multi-zone photometering IC 18 has not occurred. If not all the photometering sensors have yet been selected at step S71 (if NO at step S73), control returns to step S61 to repeat the operations at steps S61 through S71. If all the photometering sensors have been selected at step S71 (if YES at step S73), this means that the operations at S61 through S71 have been performed on all the photometering sensors of the multi-zone photometering IC 18, and accordingly the counter 31$d$ which counts the A/D conversion step number is incremented by 1 (step S75), and it is checked whether the counter value of the counter 31$d$ is greater than the loop counter value set at step S53 or S57 (step S77). If the counter value of the counter 31$d$ is not greater than the loop counter value set at step S53 or S57 (if NO at step S77), the operations at steps S59 through S77 are repeated until the counter value of the counter 31$d$ reaches the loop counter value set at step S53 or S57. If the counter value of the counter 31$d$ is greater than the loop counter value set at step S53 or S57 (if YES at step S77), it is checked whether the currently-performed PHon loop process is looping for the first time (step S79). If the currently-performed PHon loop process is not looping for the first time (if NO at step S79), control returns to the camera's overall process shown in FIG. 4.

If the currently-performed PHon loop process is looping for the first time (if YES at step S79), the time interval between the A/D converted value "bvad_min" of one period and another A/D converted value "bvad_min" of the subsequent adjacent period of the A1 photometering sensor (interval between adjacent two bottom values) is detected as the flicker repetition period (steps S81 through S85). The A/D converted value of the A1 photometering sensor which is obtained at step S61 has been stored in the RAM 31$b$ in association with the A/D conversion step number. More specifically, firstly it is checked at step S81 whether or not the A/D conversion step number "min_pos" that corresponds to the minimum A/D converted value "bvad_min" is smaller than a half of the loop counter value. If the A/D conversion step number "min_pos" is smaller than a half of the loop counter value (if YES at step S81), as shown in FIG. 6A, the minimum A/D converted value "bvad_min" exits in the first half range of all A/D conversion steps (in the range of before the 52nd step (12 milliseconds)), and therefore the second minimum A/D converted value exits in the range at least 5 milliseconds (21 steps) after the A/D conversion step number "min_pos". Therefore, in this case (if YES at step S81), the A/D conversion step number is treated as an argument "i", the argument "i" which makes the A/D converted value of the A1 photometering sensor become minimum is detected in the range "min_pos+20$\leq$i$\leq$min_pos+48", and an argument "ans" which is calculated by subtracting the A/D conversion step number "min_pos" from the detected argument "i" is stored in the RAM 31$b$ (step S83). Conversely, if the A/D conversion step number "min_pos" is equal to or greater than a half of the loop counter value (if NO at step S81), as shown in FIG. 6B, the minimum A/D converted value bvad_min exits in the latter half range of all A/D conversion steps (in the range after the 52nd step (12 milliseconds)), and therefore the second minimum A/D converted value exits in the range at least 5 milliseconds (21 steps) before the A/D conversion step number "min_pos". Therefore, in this case (if NO at step S81), the A/D conversion step number is treated as an argument "i", the argument "ii" which makes the A/D converted value of the A1 photometering sensor become minimum is detected in the range "min_pos-48$\leq$i$\leq$min_pos-20", and an argument ans which is calculated by subtracting the detected argument "i" from the A/D conversion step number "min_pos" is stored in the RAM 31$b$ (step S85). The argument "i" calculated at step S81 or S83 corresponds to the time interval between adjacent two bottom values, i.e., to the flicker repetition period.

Subsequently, a 60-Hz flag indicating whether or not the flicker frequency is 60 Hz is cleared (step S87), and it is checked whether or not the argument "ans" calculated at step S83 or S85 is smaller than 40 steps (step S89). The flicker repetition period is 10 milliseconds (43 steps) when the flicker frequency is 50 Hz, and the flicker repetition period is 8.3 milliseconds (36 steps) when the flicker frequency is 60 Hz. If the argument "ans" calculated at step S83 or S85 is smaller than 40 steps (if YES at step S89), it is determined that the flicker frequency is 60 Hz, and the 60-Hz flag is set to 1 (step S91). Subsequently, the time "delay" is corrected to be the time "delay" for the flicker frequency of 60 Hz by an expression "integ_cycle−(5−4.16)" to update the cycle-timer (step S93), and control returns to the camera's overall process shown in FIG. 4. If the argument "ans" calculated at step S83 or S85 is not smaller than 40 steps (if NO at step S89), it is determined that the flicker frequency is 50 Hz, and control returns to the camera's overall process shown in FIG. 4 with the 60-Hz flag remaining cleared. After control returning to the camera's overall process shown in FIG. 4, it is determined that the flicker frequency is 60 Hz (the flicker repetition period=8.33 milliseconds) or 50-Hz (the flicker repetition period=10 milliseconds) when the 60-Hz flag is set to 1 or cleared (set to 0), respectively.

Figure 7:
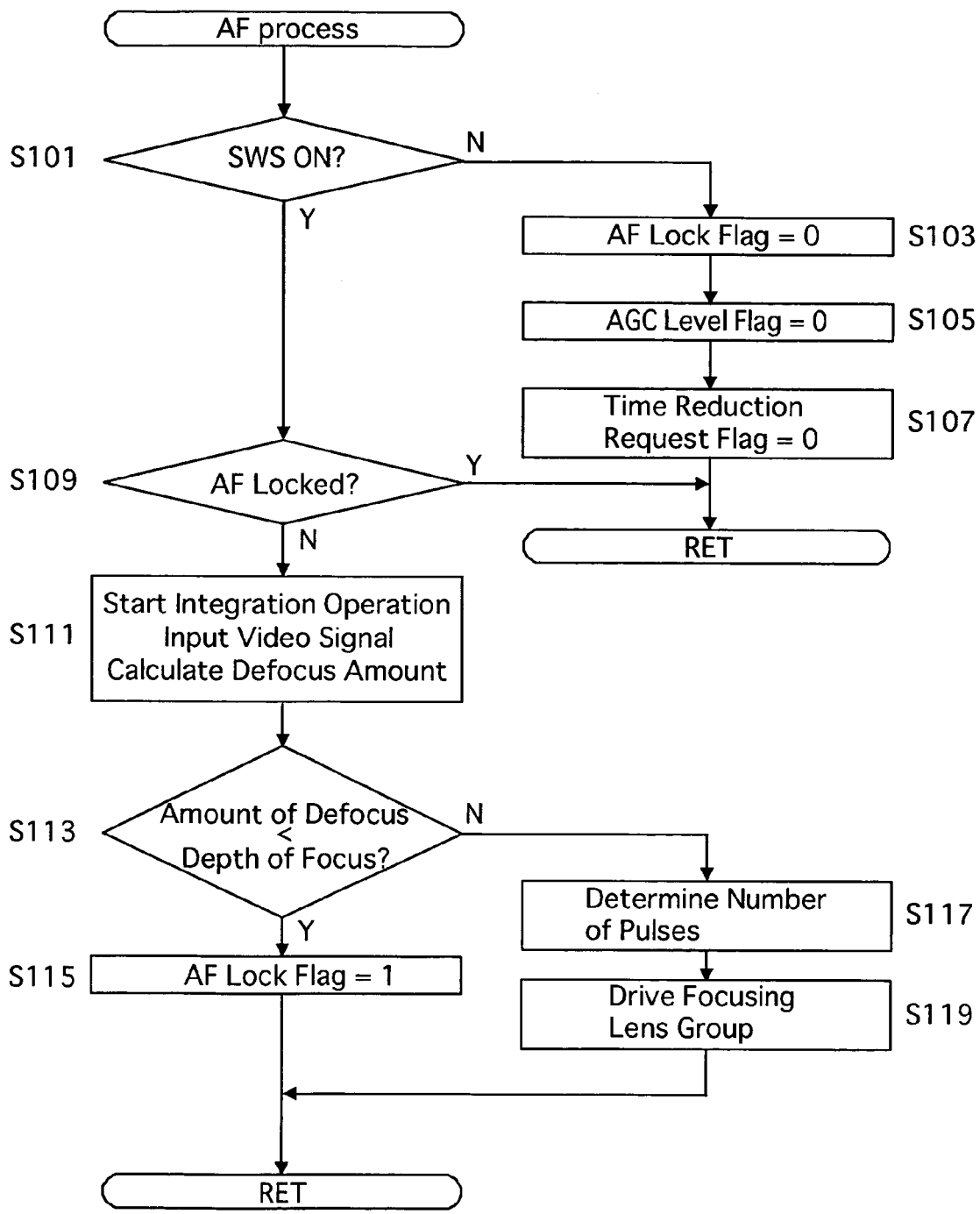
FIG. 7 is a flow chart showing an AF process performed in the camera's overall process shown in FIG. 4.

FIG. 7 is a flow chart showing the AF process performed at step S25 in the camera's overall process shown in FIG. 4. In the AF process, firstly it is checked whether or not the photometering switch SWS is ON (step S101). If the photometering switch SWS is not ON (if NO at step S101), an AF lock flag, an AGC level shift flag and a time reduction request flag are all cleared (set to zero) (steps S103, S105 and S107), and control returns to the camera's overall process shown in FIG. 4. If the photometering switch SWS is ON (if YES at step S101), it is checked whether or not the camera is in an AF locked state by checking whether the status of the AF lock flag has been set to 1 (step S109). If the camera is in the AF locked state (if YES at step S109), control simply returns to the camera's overall process shown in FIG. 4. If the camera is not in the AF locked state (if NO at step S109), the integration operation of the CCD focus detection device 61 is started, and a video signal is input from the CCD focus detection device 61 upon the completion of the integration operation to perform a defocus amount calculation process (step S111). Subsequently, it is checked whether or not the amount of defocus calculated at step S111 is smaller a predetermined depth of focus assumed as an in-focus depth (step S113). If the amount of defocus calculated at step S111 is smaller the predetermined depth of focus (if YES at step S113), the AF lock flag is set to 1, and control proceeds to the camera's overall process shown in FIG. 4. If the amount of defocus calculated at step S111 is not smaller than the predetermined depth of focus (if NO at step S113), the direction of rotation and the number of revolutions (the number of pulses output from the encoder 37) of the AF motor 33 are determined as an amount of driving of the focusing lens group 52 based on the calculated amount of defocus (step S117), and the AF motor 33 is driven in accordance with the amount of driving of the focusing lens group 52. Thereafter, control returns to the camera's overall process shown in FIG. 4.

Figure 8:
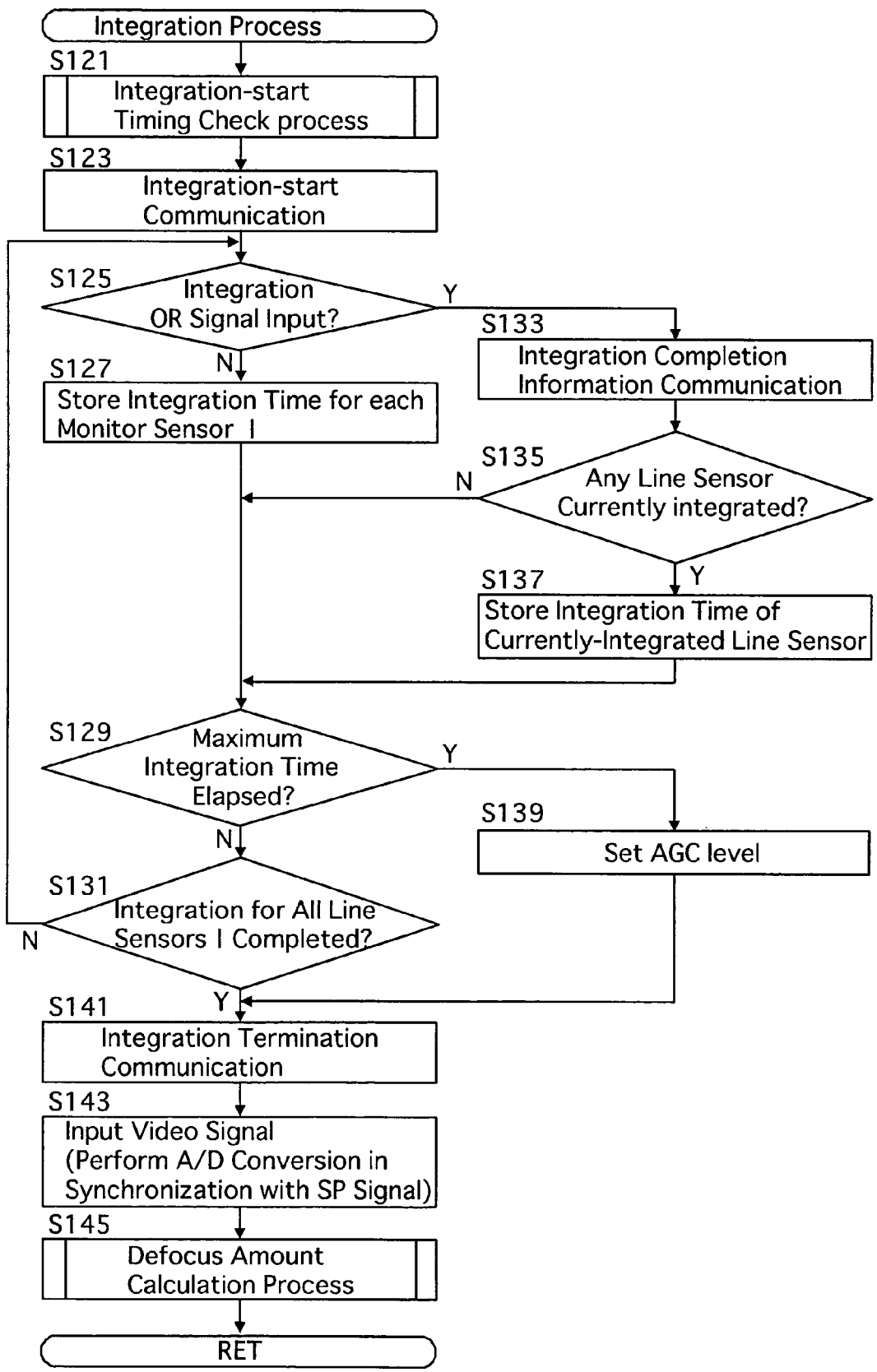
FIG. 8 is a flow chart showing an integration process performed in the AF process shown in FIG. 7.

FIG. 8 is a flow chart showing the integration process performed at step S111 in the AF process shown in FIG. 7. At the start of the integration process, an integration-start timing check process for maintaining a standby state until reaching an integration-start timing is performed (step S121), and integration-start communication is executed immediately after reaching the integration-start timing (step S123). Upon the control circuit 65 of the CCD focus detection device 61 inputting an integration-start command from the main CPU 31 via the integration-start communication, the integration operation of the line sensors I and the monitor sensors M is started.

Subsequently, it is checked whether or not the integration OR signal has been input, specifically, whether or not a monitor signal (output voltage) of any of the monitor sensors M has reached a predetermined threshold value (step S125). If the integration OR signal has not been input to the main CPU 31 (if NO at step S125), control proceeds to step S129 after the integration time is updated for each monitor sensor I (step S127). If the integration OR signal has been input to the main CPU 31 (if YES at step S125), integration completion information communication is executed (step S133), and it is checked whether or not any of the line sensors I is currently being integrated from the integration completion information on the monitor sensors M which is input via the integration completion information communication (step S135). If any of the line sensors I is currently being integrated (if YES at step S135), the integration time of the line sensor I being integrated is updated (step S137), and control proceeds to step S129. If none of the line sensors I is currently being integrated (if NO at step S135), control simply proceeds to step S129.

It is checked at step S129 whether or not a predetermined maximum integration time has elapsed. If the maximum integration time has not yet elapsed (if NO at step S129), it is checked whether or not the integration is completed for all the line sensors I by checking whether the integration AND signal has been input (step S131). If the integration is not yet completed for all the line sensors I (if NO at step S131), control returns to step S125. If the integration has been completed for all the line sensors I (if YES at step S131), control proceeds to step S141. On the other hand, if the maximum integration time has elapsed before the completion of the integration for all the line sensors I (if YES at step S129), the threshold value (AGC level) is set based on the integration time (step S139), and control proceeds to step S141.

At step S141, integration termination communication is executed. Immediately after the control circuit 65 of the CCD focus detection device 61 inputs an integration termination command from the main CPU 31 via the integration-start communication, the integration for the line sensors I is forcibly terminated if any of the line sensors I is currently being integrated, so that a video signal converted into a voltage signal in pixel units by the CCD charge detecting section 64 is output to the main CPU 31 as a VOUT signal.

Subsequently, the VOUT signal (video signal) is input to perform A/D conversion on the input VOUT signal in synchronization with a predetermined port SP signal (step S143), and the defocus amount calculation process is performed based on the A/D converted value of the VOUT signal (step S145). Upon the completion of the defocus amount calculation process, control returns to the AF process shown in FIG. 7.

Figure 9:
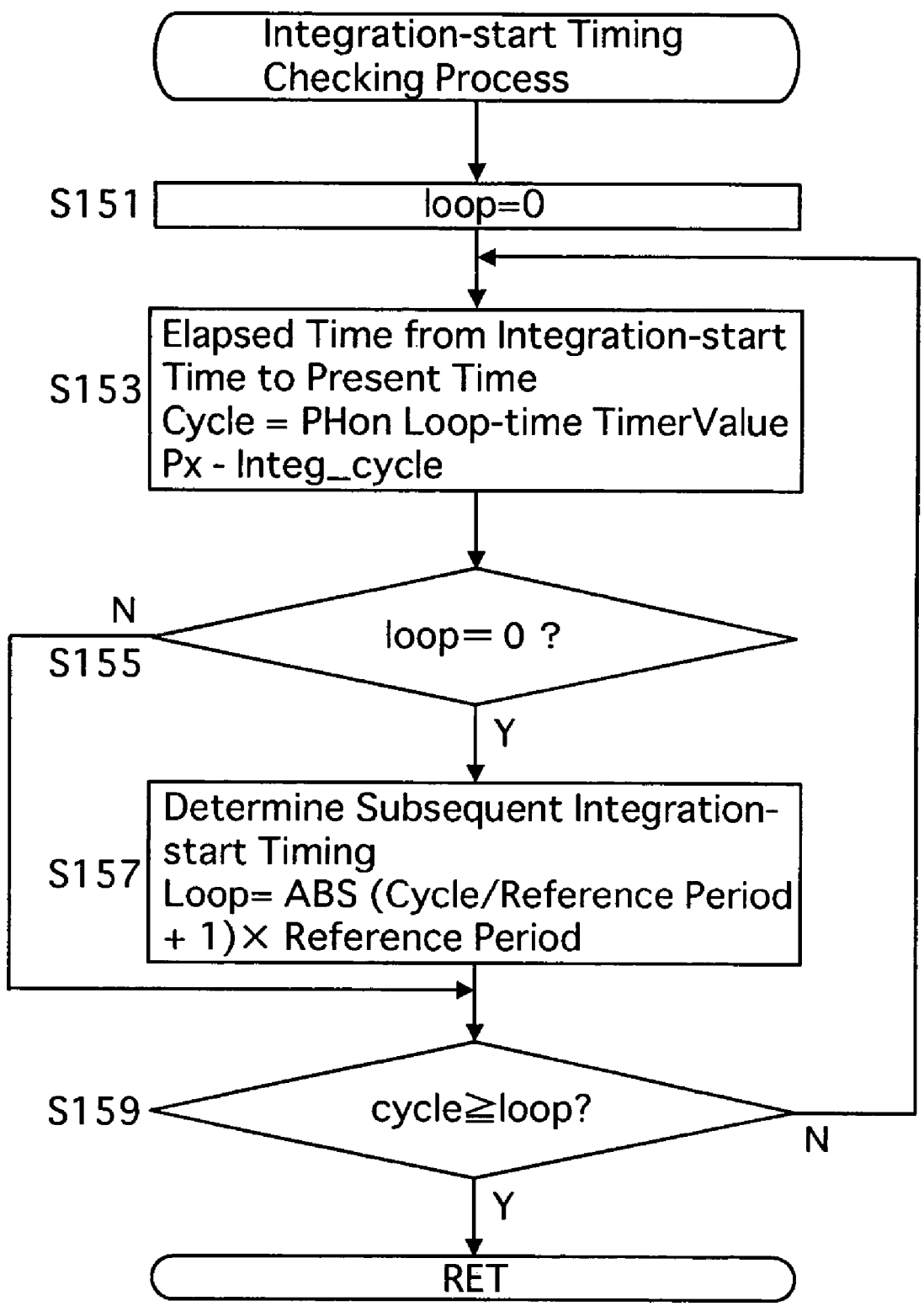
FIG. 9 is a flow chart showing an integration-start timing checking process performed in the integration process shown in FIG. 8.

FIG. 9 is a flow chart showing the integration-start timing checking process performed at step S121 in the integration process shown in FIG. 8. In the integration-start timing checking process, firstly the loop-time value is set to 0 (zero) as an initial value (step S151), and the cycle-timer value is determined (step S153). The cycle-timer value represents the elapsed time from the reference point "integ_cycle" P0 to the present time, and is calculated by the following equation: cycle-timer value=Current PHon loop timer value Px−PHon loop timer value P0 at the reference point "integ_cycle" P0.

Subsequently, it is checked whether or not the loop-time value is zero (step S155). Control skips the operation at step S157 to proceed to step S159 if the loop-time value is not zero (if NO at step S155). If the loop-time value is zero (if YES at step S155), the loop-time value is updated to set the subsequent integration-start timing (step S157), and control proceeds to step S159. As noted above, the loop-time value is calculated according to the following arithmetic expression:

ABS (cycle-timer value/reference period T+1)×reference period T. Note that the arithmetic expression: ABS (cycle-timer value/reference period T+1) is the greatest integer which is smaller than a value assigned to the argument (cycle-timer value/reference period T+1), and the reference period T is 10 milliseconds or 8.33 milliseconds when the flicker frequency is 50 Hz or 60 Hz, respectively.

At step S159 it is determined whether or not the cycle-timer value is greater than the loop-time value. If the cycle-timer value is not greater than the loop-time value (if NO at step S159), control returns to step S153 to repeat the operations at steps S153 through S159. Namely, a standby state is maintained while the cycle-timer value is repeatedly updated at step S153 until the cycle-timer value becomes greater than the loop-time value. Upon the cycle-timer value becoming greater than the loop-time value (if YES at step S159), control returns to the integration process shown in FIG. 8.

According to the above described embodiment, the influence of flickering light on the output of the multi-zone photometering IC 18 at each integration operation of the CCD focus detection device 61 becomes a uniform influence because the flicker repetition period (flicker frequency) is determined based on the time interval between adjacent two bottom values of the output of the multi-zone photometering IC 18, and the integration operation of the CCD focus detection device 61 always starts at the same timing in synchronization with the flicker repetition period. Accordingly, the influence of the flickering light on the output of the multi-zone photometering IC 18 can be substantially eliminated. Therefore, the output level of the multi-zone photometering IC 18 does not fluctuate by such an influence of flickering light at each integration operation of the CCD focus detection device 61, and hence a stable output level of the multi-zone photometering IC 18 is achieved. According to the present embodiment, even if a difference between the integrated value in the monitor aperture portion MA and the integrated value in the monitor charge detecting section 62 occurs, the amount of this difference becomes constant without being influenced by flickering, and therefore, the integrated value in the monitor aperture portion MA can be corrected on the basis of the integrated value in the monitor charge detecting section 62. In contrast, if the integration operation of the CCD focus detection device 61 is started at any given time without regard to the flicker repetition period as in the prior art, the difference between the integrated value in the monitor aperture portion MA and the integrated value in the monitor charge detecting section 62 fluctuates by the influence of flickering to thereby make it impossible to obtain a stable output level of the multi-zone photometering IC 18.

Although the flicker repetition period is determined from the time interval between adjacent two bottom values of the output of a photometering sensor device (the multi-zone photometering IC 18) in the above described embodiment, it is possible for the flicker repetition period to be determined from the interval between adjacent two peak values of the output of the photometering sensor device. Alternatively, it is possible to detect points in time at which the output of the photometering sensor device reaches a predetermined threshold value to determine the flicker repetition period based on the time intervals between the detected points.

Although the integration operation of the CCD focus detection device 61 is started in synchronization with peaks of flickering light in the above illustrated embodiment, the integration operation of the CCD focus detection device 61 can be started at any point in the flicker repetition period as long as the integration operation of the CCD focus detection device 61 is always started at the same timing relative to the flicker repetition period.

The present invention can be applied not only to a single-lens reflex camera but also to a compact camera such as a lens-shutter compact camera and a compact digital camera.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A focus detection device comprising:
    an AF sensor which converts received object light into electrical charges, integrates said electrical charges, and outputs said integrated electrical charges as a video signal in pixel units;
    a photometering sensor which converts received light into an electrical signal to output said electrical signal as a photometering signal;
    a flicker repetition period determiner that determines a flicker repetition period of said received object light from fluctuations of said photometering signal of said photometering sensor, wherein said flicker repetition period determiner detects one of bottom or peak values of said photometering signal of said photometering sensor, an output level of which fluctuates periodically, to determine said flicker repetition period from a time interval between said detected one of bottom and peak values; and
    a controller which causes said AF sensor to start integrating said electrical charges in synchronization with said flicker repetition period, wherein said controller sets an integration cycle reference point, at which a predetermined period of time elapses from the time at which said one of bottom and peak values is detected, and causes said AF sensor to start integrating said electrical charges upon an elapsed time from said integration cycle reference point reaching an integer multiple of said flicker repetition period determined by said flicker repetition period determiner.

2. The focus detection device according to claim 1, wherein said flicker repetition period determiner determines that a flicker frequency of said received object light is 50 Hz when where said time interval between said detected one of bottom and peak values is greater than a predetermined time interval, and that said flicker frequency of said received object light is 60 Hz when said time interval between said one of detected bottom and peak values is one of equal to and smaller than said predetermined time interval.

3. The focus detection device according to claim 1, wherein said AF sensor comprises CCD line sensors.

4. The focus detection device according to claim 1, wherein said photometering sensor comprises a multi-zone photometering IC.

5. The focus detection device according to claim 1, wherein said focus detection device is incorporated in an autofocus camera.

6. A focus detection device comprising:
    a phase-difference AF sensor;
    a photometering sensor;
    a flicker repetition period determiner that determines a flicker repetition period of object light received by said phase-difference AF sensor from fluctuations of an output level of said photometering sensor, wherein said flicker repetition period determiner detects one of bottom and peak values of said photometering signal of said photometering sensor, an output level of which fluctuates periodically, to determine said flicker repetition period from a time interval between said detected one of bottom and peak values; and a controller which causes said phase-difference AF sensor to start performing an integration operation in synchronization with said flicker repetition period, wherein said controller sets an integration cycle reference point, at which a predetermined period of time elapses from the time at which said one of bottom and peak values is detected, and causes said phase-difference AF sensor to start integrating said electrical charges upon an elapsed time from said integration cycle reference point reaching an integer multiple of said flicker repetition period determined by said flicker repetition period determiner.

7. The focus detection device according to claim 6, wherein said flicker repetition period determiner determines that a flicker frequency of said received object light is 50 Hz when said time interval between said detected one of bottom and peak values is greater than a predetermined time interval, and that said flicker frequency of said received object light is 60 Hz when said time interval between said detected one of bottom and peak values is one of equal to and smaller than said predetermined time interval.

8. The focus detection device according to claim 6, wherein said focus detection device is incorporated in an autofocus camera.

9. The focus detection device according to claim 6, wherein said photometering sensor comprises a multi-zone photometering IC.

10. A focus detection device comprising:

an AF sensor which converts received object light into electrical charges, integrates said electrical charges, and outputs said integrated electrical charges as a video signal in pixel units;

a photometering sensor which converts received light into an electrical signal to output said electrical signal as a photometering signal;

a flicker repetition period determiner that determines a flicker repetition period of said received object light from fluctuations of said photometering signal of said photometering sensor, wherein said flicker repetition period determiner detects points in time at which said photometering signal of said photometering sensor, an output level of which fluctuates periodically, reaches a predetermined threshold value to determine said flicker repetition period from a time interval between said points; and a controller which causes said AF sensor to start integrating said electrical charges in synchronization with said flicker repetition period, wherein said controller sets an integration cycle reference point at a time at which a predetermined period of time elapses from the time at which each of said points is detected, wherein said controller causes said AF sensor to start integrating said electrical charges upon an elapsed time from said integration cycle reference point reaching an integral multiple of said flicker repetition period determined by said flicker repetition period determiner.

11. The focus detection device according to claim 10, wherein said flicker repetition period determiner determines that a flicker frequency of said received object light is 50 Hz when said time interval between said detected points is greater than a predetermined time interval, and that said flicker frequency of said received object light is 60 Hz when said time interval between said detected points is one of equal to and smaller than said predetermined time interval.

12. The focus detection device according to claim 10, wherein said AF sensor comprises CCD line sensors.

13. The focus detection device according to claim 10, wherein said photometering sensor comprises a multi-zone photometering IC.

14. The focus detection device according to claim 10, wherein said focus detection device is incorporated in an autofocus camera.

* * * * *